US008613431B1

(12) United States Patent
Deloy et al.

(10) Patent No.: US 8,613,431 B1
(45) Date of Patent: Dec. 24, 2013

(54) VIBRATION ISOLATOR WITH IMPROVED SYMMETRY

(75) Inventors: Christian T. Deloy, Marion, IA (US); Nicholus R. Clinkinbeard, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 379 days.

(21) Appl. No.: 12/570,339

(22) Filed: Sep. 30, 2009

(51) Int. Cl.
*F16F 1/04* (2006.01)
*B60G 11/56* (2006.01)

(52) U.S. Cl.
USPC .......................................... 267/148; 248/570

(58) Field of Classification Search
USPC ................. 267/166, 167, 160, 148–149, 136, 267/179–180, 286–287; 248/570, 618, 626, 248/602, 638
See application file for complete search history.

(56) References Cited

U.S. PATENT DOCUMENTS

| 4,403,681 | A |   | 9/1983  | Desjardins |
| 5,169,110 | A | * | 12/1992 | Snaith et al. .................. 248/570 |
| 5,549,285 | A | * | 8/1996  | Collins ......................... 267/148 |
| 7,204,479 | B2 |  | 4/2007  | Power et al. |
| 8,262,068 | B1 | * | 9/2012 | Monson et al. ............... 267/292 |
| 2004/0070128 | A1 | * | 4/2004 | Balsells ........................ 267/180 |
| 2011/0062640 | A1 | * | 3/2011 | Leon ............................. 267/166 |

FOREIGN PATENT DOCUMENTS

WO    WO8808933 A1 * 11/1988

* cited by examiner

*Primary Examiner* — Anna Momper
(74) *Attorney, Agent, or Firm* — Donna P. Suchy; Daniel M. Barbieri (57) ABSTRACT

A vibration isolator includes mounting members engaged with an isolator member. The isolator member contains a primary loop and a secondary loop, wherein the primary loop is the point of attachment to the mounting members. The secondary loop provides added symmetry between the compression rate and at least one of the roll spring rate and the shear spring rate of the isolator member. Features of the vibration isolator, such as the number of secondary loops, may be varied to achieve an isolator member with particular characteristics required for individual applications.

18 Claims, 8 Drawing Sheets

FIG. 1

PRIOR ART

VIBRATION ISOLATOR WITH IMPROVED SYMMETRY

The U.S. Government has a paid-up license in this invention and the right in limited circumstances to require the patent owner to license others on reasonable terms as provided for by the terms of contract No. FCS003548-4JM21 awarded by the U.S. Department of Defense.

BACKGROUND

Vibration isolator devices are commonly utilized to absorb vibrations and reduce movement between two structures. A typical vibration isolator contains a vibration attenuation element or an isolator member situated between the two structures.

Various configurations of vibration isolators are used in rugged applications where attenuation of vibration inputs is required to meet performance requirements in severe dynamic environments. Cable or wire-rope isolators are generally well-suited for such environments; however, space constraints, installation limitations, as well as cost constraints may diminish the effectiveness of such isolators.

SUMMARY OF THE INVENTION

The present invention is a vibration isolator using a cable or wire rope isolator. The isolator is wound to have a primary structure, typically in the form of a primary loop, and a secondary structure, typically in the form of a secondary loop. The primary loop has a radius greater than the radius of the secondary loop. This adds symmetry between the compression spring rate, and at least one of the roll spring rate and the shear spring rate of the vibration isolator. In a preferred embodiment, the vibration isolator has two mounting members separated by an isolator member. The mounting members contain a number of holes, through which the isolator member is wound forming a winding path.

A number of characteristics of the vibration isolator may be varied to achieve a particular isolator member with specific spring rates. The number of holes in the mounting members may be customized to include a number of primary loops. Additionally, the number of secondary loops within the primary loops, or even each primary loop, may be customized to provide the required symmetry. The isolator member may be a continuous spring member or may be a number of separate segments positioned between the mounting members. Of the segments, only certain segments may contain a secondary loop.

The vibration isolator may be manufactured by providing the mounting members with a mechanism for engaging the isolator member. The isolator member has a specific winding path positioned between the two mounting members. The winding path can be wound such that it passes through the mounting members a particular number of times. Additionally, the isolator member can be manufactured to include a differing number of primary loops and secondary loops to achieve the desired effect.

The invention will be described in further detail below in conjunction with the attached figures, wherein like reference numerals indicate like components.

DETAILED DESCRIPTION

Figure 1:
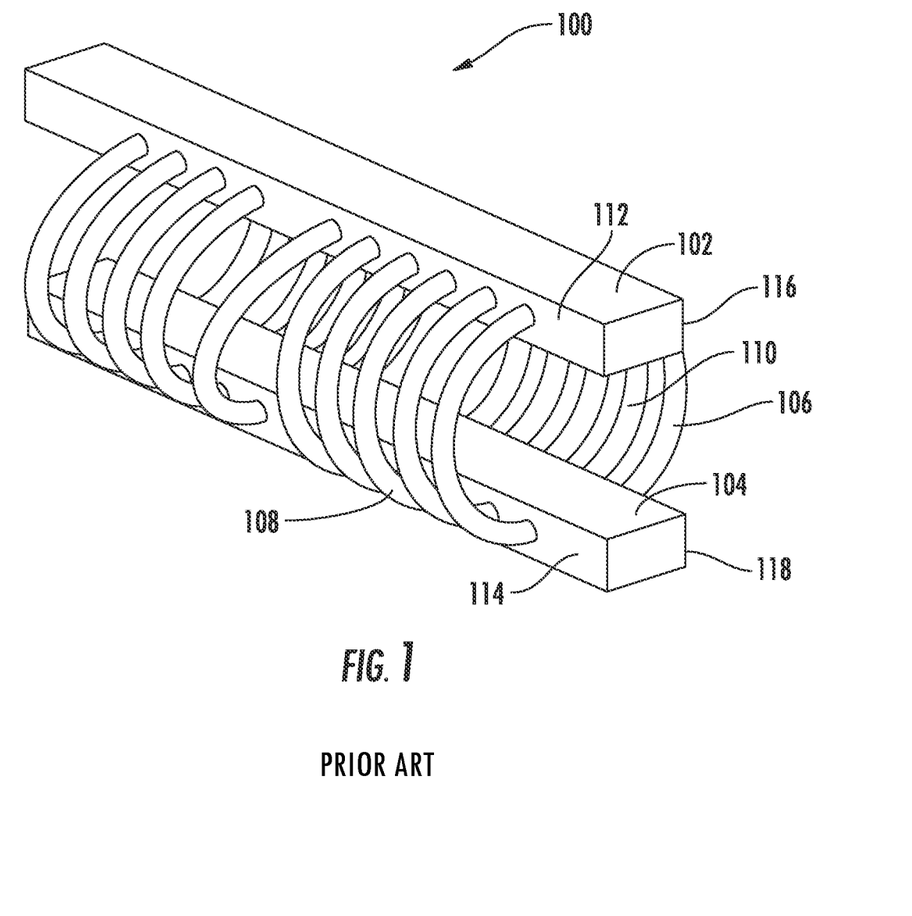
FIG. 1 is a perspective view of a standard vibration isolator.

Now referring to the drawings, FIG. 1 shows a standard prior art vibration isolator 100 includes a first mounting member 102, a second mounting member 104 and an isolator member 106. The mounting members 102, 104 each have a first side 112, 114 and a second side 116, 118 respectively. The isolator member 106 further includes a plurality of segments 108, 110 positioned between the mounting members 102, 104. The vibration isolator 100 has a specific compression spring rate, a specific roll spring rate, and a specific shear spring rate. The spring rates are dependent on variables such as the composition of the isolator member 106, the diameter and length of the isolator member 106. In addition, the angle of the segments 108, 110 relative to the mounting members 102, 104 may have an effect on the spring rates of the standard vibration isolator 100.

Figure 2:
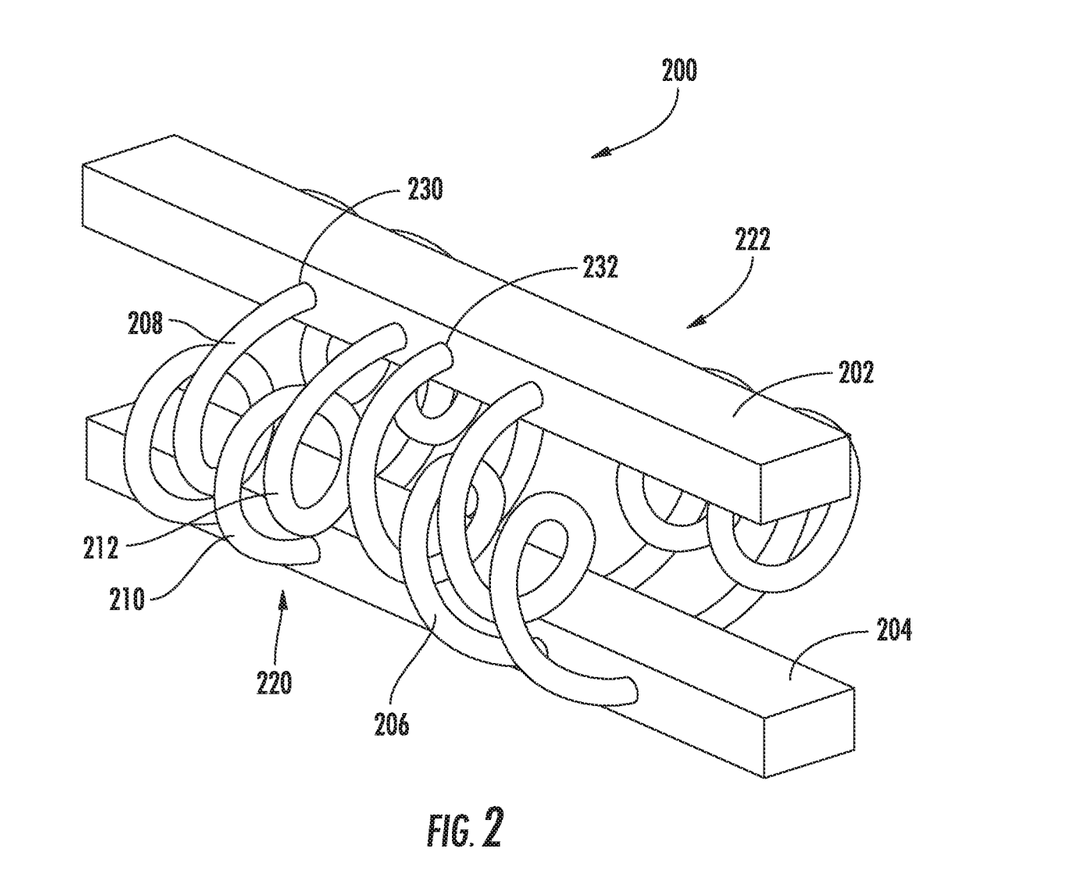
FIG. 2 is a perspective view of a vibration isolator with a secondary structure.
Figure 3:
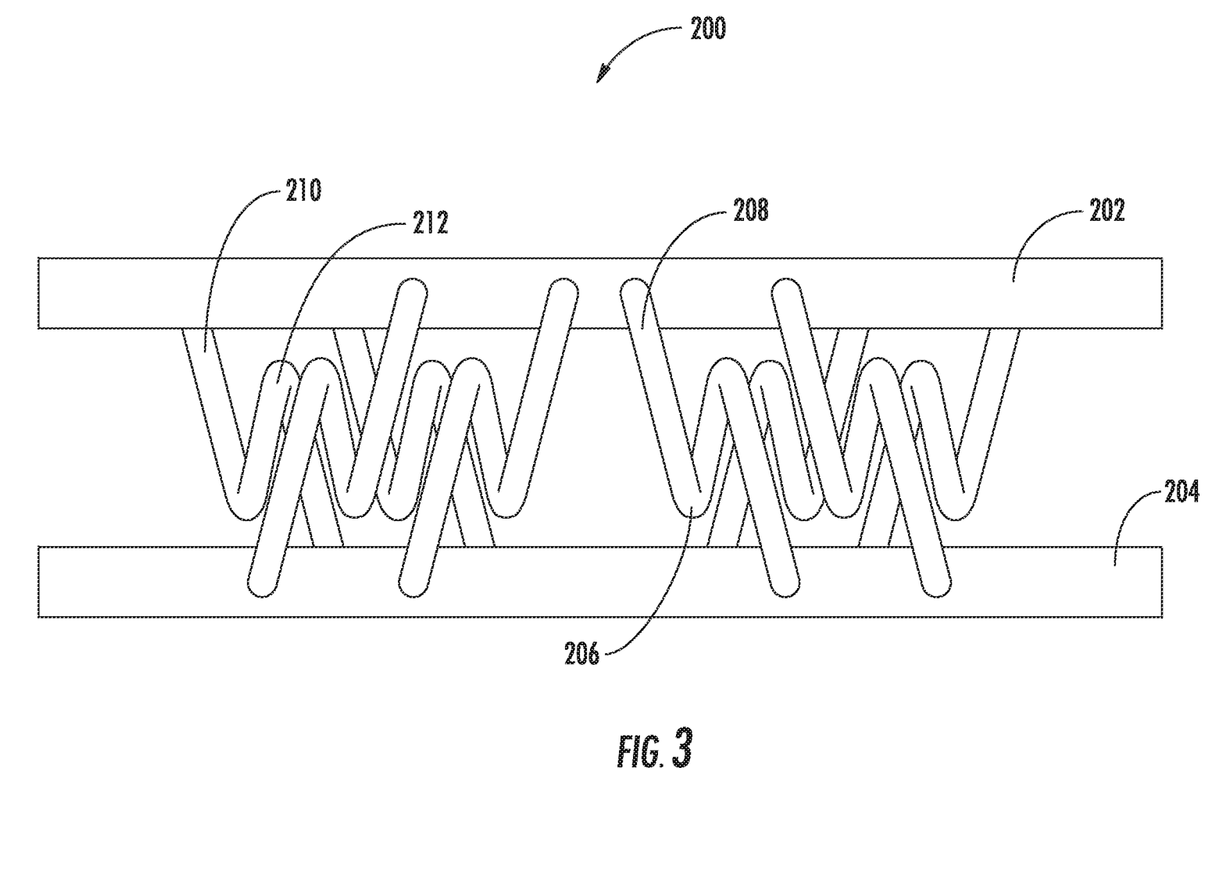
FIG. 3 is a side view of a vibration isolator with a secondary structure.
Figure 4:
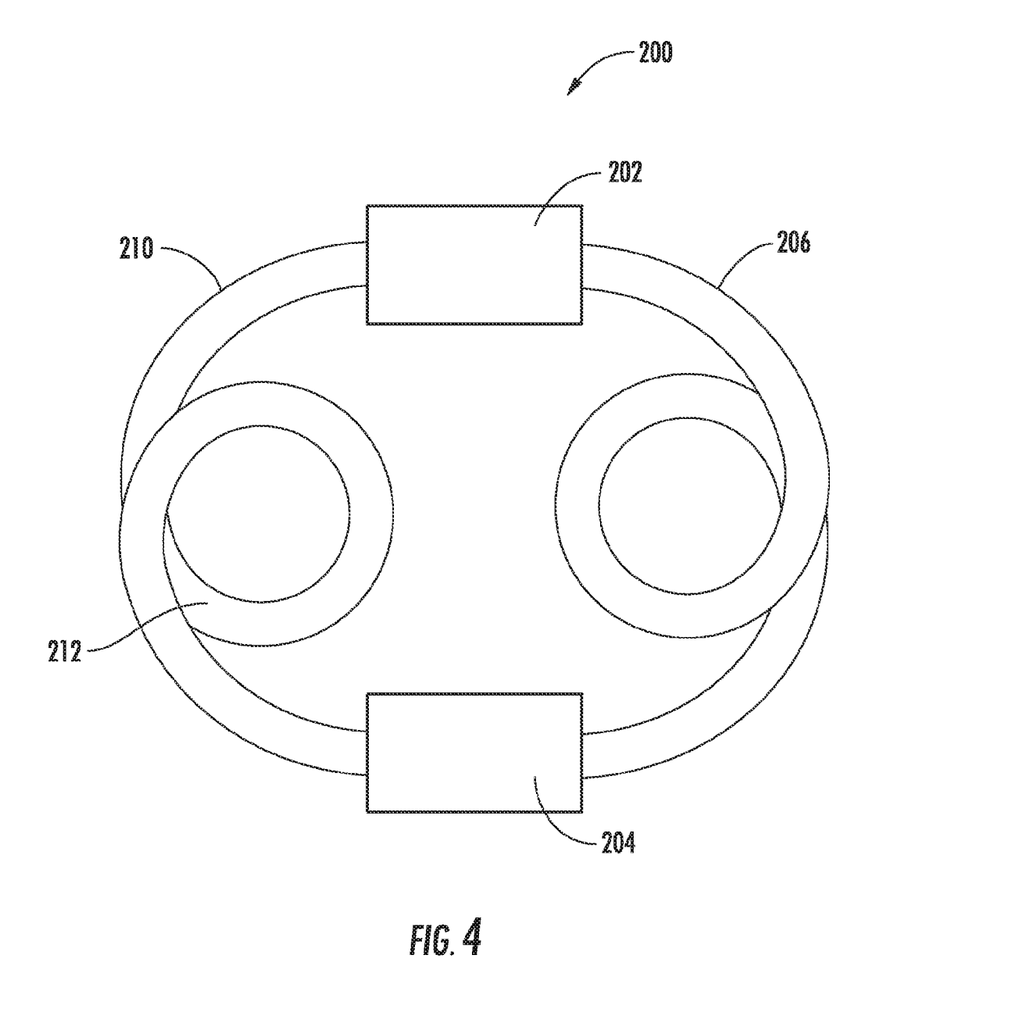
FIG. 4 is a top view of a vibration isolator with a secondary structure.

Now referring to FIGS. 2, 3 and 4, a vibration isolator 200 according to the present invention is detailed. The vibration isolator 200 includes a first mounting member 202, a second mounting member 204 and an isolator member 206, wherein the first mounting member 202 is directly opposite the second mounting member 204. The isolator member 206 is engageable with the first mounting member 202 and the second mounting member 204.

The isolator member 206 further includes a plurality of segments 208 positioned between the mounting members 202, 204. The plurality of segments 208 including at least one segment 208 having a primary structure in the form of primary loop 210 and a secondary structure in the form of secondary loop 212 which are positioned along a winding path. The primary loop 210 is generally envisioned to wrap approximately three hundred and sixty degrees, although in certain embodiments, only one half of a primary loop may be utilized, spanning only from a first mounting member to a second mounting member. In such an embodiment in which the mounting members directly oppose one another, the primary loop would wrap approximately one hundred eighty degrees. Again referring to FIGS. 2, 3 and 4, the radius of the primary loop 210 is greater than the radius of the secondary loop 212. The presence of the secondary loop 212 provides more even symmetry between the compression spring rate and at least one of the roll spring rate and the shear spring rate of the isolator member 206 than does the standard vibration isolator 100 depicted in FIG. 1.

The spring rates may be affected by several factors including the total number of primary loops 210, the total number of secondary loops 212, and the placement of both the primary loops 210 and secondary loops 212 relative to the mounting members 202, 204. The vibration isolator 200 has a first side 220 and a second side 222. The isolator member 206 contains four primary loops 210 and eight secondary loops 212 wherein each primary loop 210 contains two secondary loops 212. Each primary loop 210 has one secondary loop 216 on the first side 220 and the second side 222. A standard prior art isolator with four primary loops was found to have a maximum spring rate (in compression) 6.1 times the minimum spring rate (in shear), yielding a maximum resonant frequency 2.5 times the minimum. In comparison, the vibration isolator 200 containing eight secondary loops 212 in addition to four primary loops 210 was found to have a maximum spring rate (in compression) 2.6 times the minimum spring rate (in roll), yielding an improved maximum resonant frequency 1.6 times the minimum.

The isolator member 206 detailed in FIGS. 2-4, may be one continuous piece of material that enters and exits the first mounting member 202 and the second mounting member 204 at various points 230. The points 230 include through holes 232 which span the width of the mounting members 202, 204. Alternatively, the primary loops 210 may span only between respective sides of the mounting members 202, 204; hence the primary loops 210 depicted in FIGS. 2-4 would be formed by two separate portions. The inclusion of one secondary loop 212 still allows added symmetry to such an embodiment.

Other slight modifications to the embodiment shown in FIGS. 2-4 are possible and still able to produce more even symmetry between the spring rates. The number of primary loops and secondary loops may be varied and the number of primary loops may be equal to or different from the number of secondary loops. In addition, some primary loops or sides may be void of secondary loops. The isolator member may be composed of a spring member or a plurality of spring members. Furthermore, the spring members may be made of cable, wire-rope, wire braid or another material. Overall, the winding patterns and material of the isolator member may take any form that is advantageous for a particular application.

Similarly to the potential modifications of the isolator member, modifications to the mounting members 202, 204 depicted in FIGS. 2-4 allow the vibration isolator to be further customized. Preferably the mounting members 202, 204 are made of bar stock having a length and a number of holes. The bar stock can be split into separate portions that can be connected together, such as with threaded fasteners, to clamp around the isolator member. The length and number of holes may be varied as well as the orientation of the mounting members relative to one another. Additionally, the isolator member may be wound through each hole or particular holes may be skipped. Furthermore, each mounting member may include two portions that act as clamping members securing the isolator member. The mounting members can also be made of other materials and can have different constructions, including being molded around the isolator member.

Figure 5:
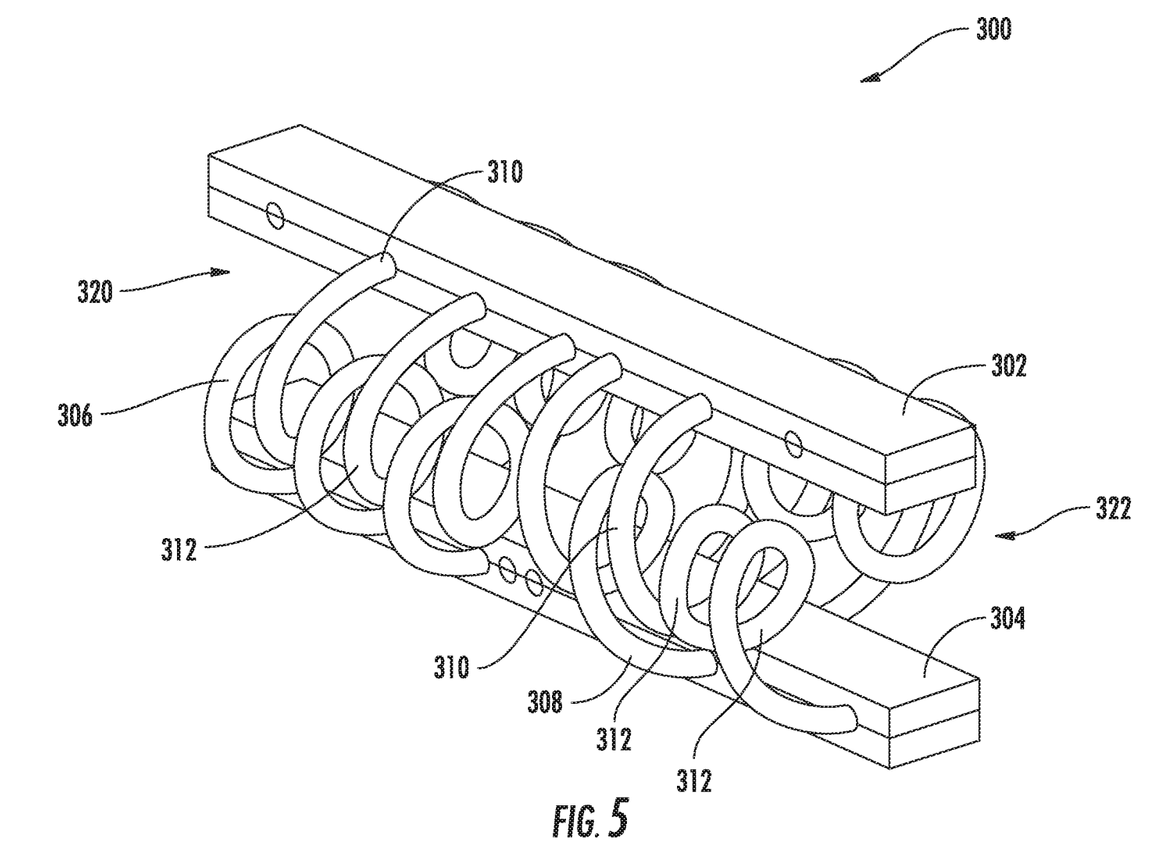
FIG. 5 is a perspective view of an alternate embodiment of a vibration isolator with a secondary structure.
Figure 6:
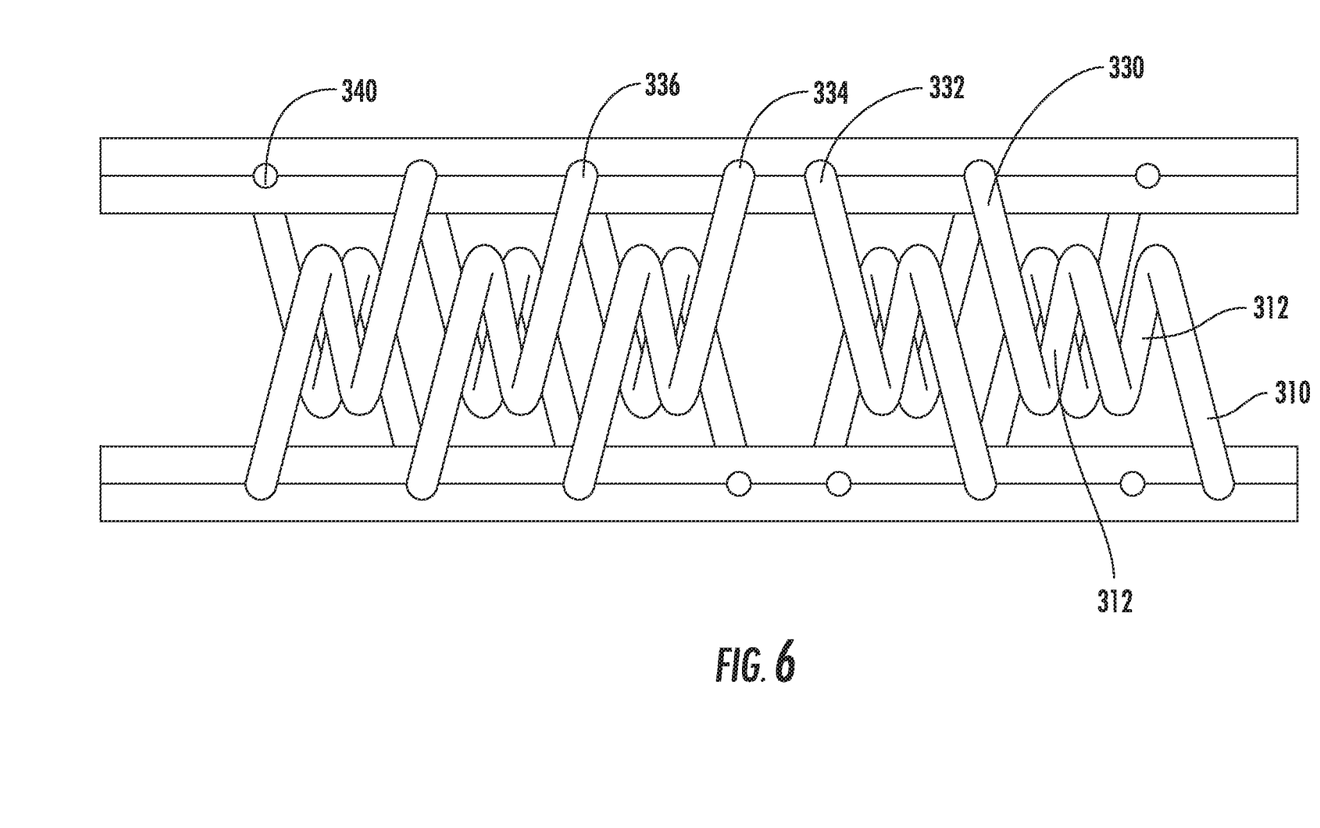
FIG. 6 is a side view of the embodiment depicted in FIG. 5.

The embodiment depicted in FIGS. 5-6 demonstrates some of the available modifications. A vibration isolator 300 according to the present invention includes a first mounting member 302, a second mounting member 304 and an isolator member 306. The isolator member 306 is engageable with the first mounting member 302 and the second mounting member 304.

The isolator member 306 further includes a plurality of segments 308 positioned between the mounting members 302, 304. The plurality of segments 308 containing at least one of the segments 308 having a primary structure in the form of a loop 310 and a secondary structure in the form of a loop 312 which are positioned along a winding path. The radius of the primary loop 310 is greater than the radius of the secondary loop 312.

The vibration isolator 300 has a first side 320 and a second side 322. The first side 320 has several secondary loops 312, whereas the second side 322 has a different number of secondary loops 312. The isolator member 306 includes a first spring member 330, a second spring member 332, a third spring member 334 and a fourth spring member 336. The first spring member 330 has one primary loop 310 with two secondary loops 312 on the first side 320 and one secondary loop 312 on the second side 322. The second spring member 332 has one primary loop 310 with one secondary loop 312 on the first side 320 and one secondary loop 312 on the second side 322. The third spring member 334 and the fourth spring member 336 each contain three secondary loops 312. The mounting members 302, 304 contain holes 340 which are not used to engage the isolator member 306. The differences between the vibration isolator 200 and the vibration isolator 300 demonstrate the ability to customize the device for a particular application. While one vibration isolator can be used to isolate a device from vibration, it is also anticipated that two or more vibration isolators can be used in conjunction with one another to isolate the device from vibration. The particular application will dictate the number of vibration isolators and the orientations of the vibration isolators.

Figure 7:
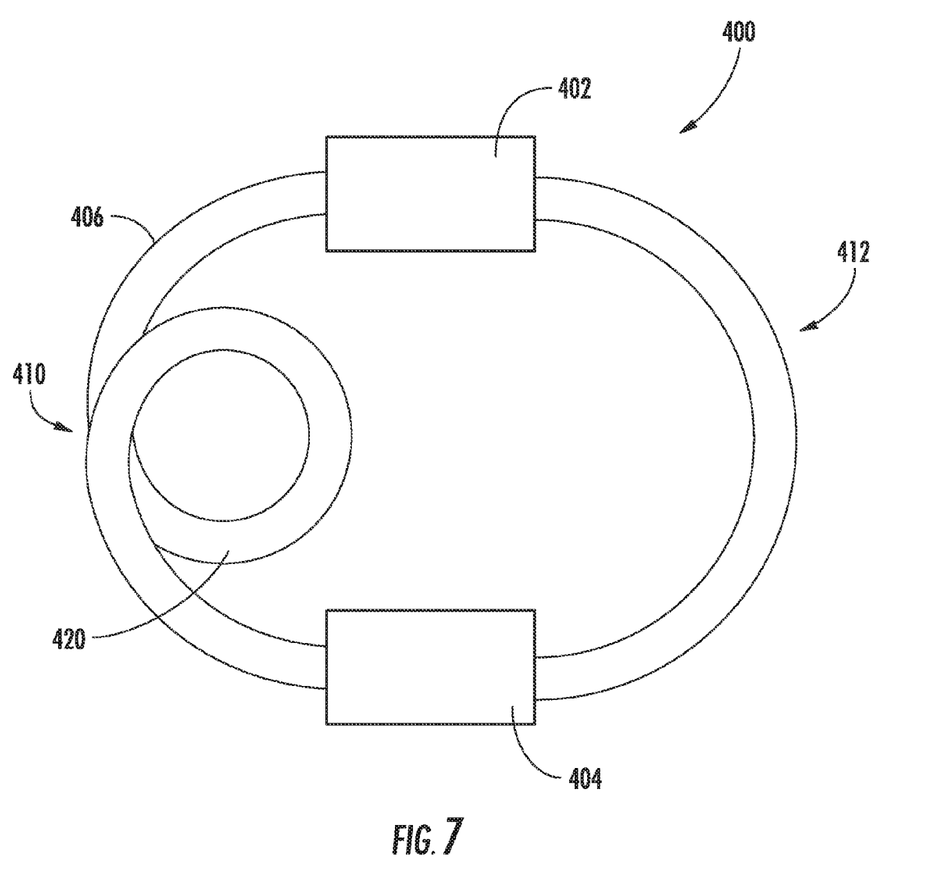
FIG. 7 is a top view of another alternate embodiment of a vibration isolator.
Figure 8:
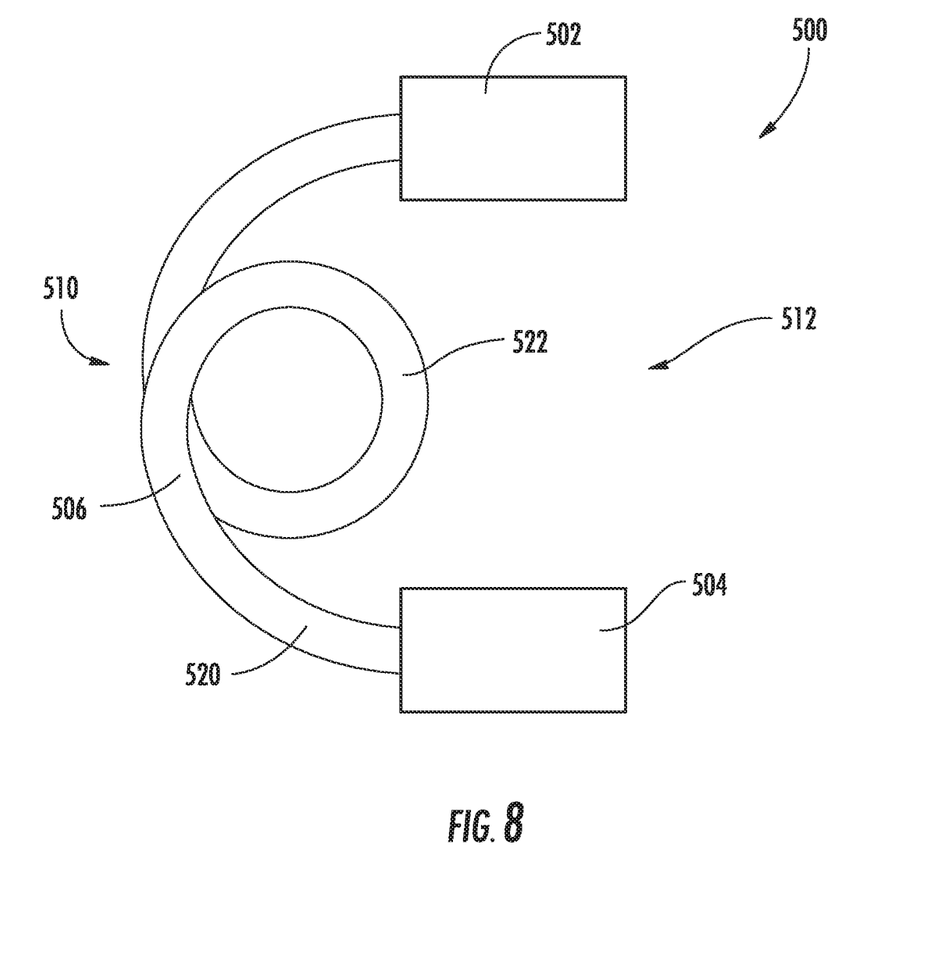
FIG. 8 is a top view of yet another alternate embodiment of a vibration isolator.

FIGS. 7 and 8 show other possible embodiments. FIG. 7 demonstrates a vibration isolator 400 including a first mounting member 402, a second mounting member 404 and an isolator element 406. The isolator 400 has a first side 410 and a second side 412. Only the first side 410 contains a secondary loop 420. In FIG. 8, a vibration isolator 500 includes a first mounting 502, a second mounting 504 and a vibration isolator 506. The isolator 500 has a first side 510 and a second side 512 wherein only the first side 510 has a partial primary loop 520 and a secondary loop 522. The second side 512 is devoid of any primary loops 520 (or portion thereof) and secondary loops 522.

The vibration isolators 200, 300 and similar embodiments may be made by providing first and second mounting members with an isolator member positioned between the mounting members. The isolator member is then wound through a particular combination of holes contained within the mounting members. The isolator member must contain at least one primary structure and at least one secondary structure, preferably in the form of a primary loop and secondary loop.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A vibration isolator comprising:
a first mounting member;
a second mounting member;
at least one isolator member having a winding path,
the isolator member engageable with the first mounting member and the second mounting member,
the isolator member having spring rates including a compression spring rate, a roll spring rate, and a shear spring rate,
the isolator member further comprising at least one primary structure and at least one secondary structure positioned along the winding path;
the at least one secondary structure being separated from the first mounting member and the second mounting member;

the at least one primary structure and the at least one secondary structure are in series between the first mounting member and the second mounting member;

the at least one secondary structure being positioned entirely outside of a centerline established between a longitudinal axis of the first mounting member and a longitudinal axis of the second mounting member; the at least one secondary structure providing increased symmetry between at least two of the spring rates of the isolator member when compared to corresponding spring rates of an isolator member without at least one secondary structure;

wherein the at least one primary structure is at least one first loop, the at least one secondary structure is at least one second loop, and both of the at least one first loop and the at least one second loop wind in a same direction.

2. The device of claim 1, wherein:
the at least one second loop has a second radius;
the at least one first loop has a first radius larger than the second radius.

3. The device of claim 2, wherein:
the isolator member contains a plurality of segments positioned along the winding path,
wherein at least one of the plurality of segments has only a first loop and at least another of the plurality of segments has both a first loop and a second loop.

4. The device of claim 3, wherein:
the isolator member is constructed of at least one spring member.

5. The device of claim 4, wherein:
at least one of the plurality of segments includes a different number of first loops and second loops than another of the plurality of segments.

6. The device of claim 3, wherein:
the isolator member is constructed of at least one wire rope.

7. A vibration isolator assembly comprising:
a first mounting member;
a second mounting member;
an isolator member engaged with the first mounting member and the second mounting member to separate the first and second mounting members,
the isolator member comprising a plurality of segments positioned between the first and second mounting members, with at least one of the plurality of segments having a primary structure and a secondary structure;
wherein the secondary structure is separated from the first mounting member and the second mounting member;
wherein the primary structure and the secondary structure are in series between the first mounting member and the second mounting member;
the secondary structure being positioned entirely outside of a centerline established between a longitudinal axis of the first mounting member and a longitudinal axis of the second mounting member;
wherein the primary structure comprises a primary loop, the secondary structure comprises a secondary loop, and both of the primary loop and the secondary loop wind in a same direction.

8. The isolator of claim 7, wherein:
the primary loop has a first radius;
the secondary loop has a second radius;
the first radius being greater than the second radius.

9. The isolator of claim 8, wherein:
the first mounting member is positioned directly opposite the second mounting member with the isolator member connecting the first and second mounting members,
wherein at least one of the plurality of segments has only a primary loop.

10. The isolator of claim 9, wherein:
the isolator member is formed by a continuous spring member.

11. The isolator of claim 10, wherein:
a first portion of the continuous spring member is positioned between a first side of the first mounting member and a first side of the second mounting member;
a second portion of the continuous spring member is positioned between a second side of the first mounting member and a second side of the second mounting member;
only one of the first portion and the second portion contains a secondary loop.

12. The isolator of claim 11, wherein:
each of the first and second mounting members is a clamping member,
the clamping members clamping and securing the plurality of segments.

13. The isolator of claim 12, wherein:
the spring member comprising a plurality of primary and secondary loops,
wherein only the primary loops are clamped within the clamping members.

14. The device of claim 9, wherein:
the isolator member is formed by a plurality of spring members.

15. The device of claim 8, wherein:
the isolator member is a wire braid.

16. A method for producing a vibration isolator comprising:
providing a first mounting member and a second mounting member with at least one isolator member positioned between the first and second mounting members to form a plurality of isolator member segments separating the first and second mounting members;
each of the plurality of isolator member segments comprising a primary structure;
determining spring rates of the vibration isolator;
determining a resonant frequency of the vibration isolator;
providing at least one of the plurality of isolator member segments with a secondary structure in series with the primary structure, wherein the secondary structure is separated from the first mounting member and the second mounting member, the secondary structure being positioned entirely outside of a centerline established between a longitudinal axis of the first mounting member and a longitudinal axis of the second mounting member;
wherein inclusion of the secondary structure lowers the resonant frequency of the vibration isolator as compared to the vibration isolator having only the primary structure;
providing the primary structure with a primary loop, the secondary structure with a secondary loop, and where both of the primary loop and the secondary loop wind in a same direction.

17. The method of claim 16, further comprising:
providing each of the first and second mounting members with a plurality of through holes for accommodating segments of the isolator member;
winding the isolator member throughout a particular combination of a plurality of holes in each of the mounting members.

18. The method of claim 16, further comprising:
 providing at least another of the plurality of isolator member segments with only a primary loop.

\* \* \* \* \*